United States Patent [19]
Muller

[11] Patent Number: 4,920,862
[45] Date of Patent: May 1, 1990

[54] TRUNK PISTON COMPRESSOR

[75] Inventor: Eduard Muller, Ettenhausen, Switzerland

[73] Assignee: Maschinenfabrik Sulzer-Burckhardt, Basel, Switzerland

[21] Appl. No.: 247,945

[22] Filed: Sep. 22, 1988

[30] Foreign Application Priority Data

Sep. 25, 1987 [CH] Switzerland .................. 03730/87

[51] Int. Cl.⁵ .................. F01B 31/10; F16J 15/18
[52] U.S. Cl. .................. 92/158; 92/153; 92/72; 92/148; 92/165 R
[58] Field of Search .................. 92/68, 72, 141, 148, 92/149, 153, 156, 158, 160, 163, 165, 168; 417/273, 266; 184/6.8, 18; 74/44 X; 384/11 X, 29, 32

[56] References Cited

U.S. PATENT DOCUMENTS

| | | | |
|---|---|---|---|
| 1,154,336 | 9/1915 | Persson | 417/266 |
| 1,456,125 | 5/1923 | Fledderman | 384/11 |
| 1,595,028 | 8/1926 | Smith | 74/44 |
| 1,816,516 | 7/1931 | Clement | 184/6.8 |
| 2,006,583 | 7/1935 | Dennison | 92/160 |
| 2,109,735 | 3/1938 | Rosen | 92/141 |
| 2,203,609 | 12/1935 | Nelson | 417/273 |
| 2,426,613 | 9/1947 | Jackson | 92/153 |
| 2,718,443 | 9/1955 | Mason | 92/160 |
| 3,053,342 | 9/1962 | Mansoff | 184/6.8 |
| 3,059,418 | 10/1962 | Johnston | 74/44 |
| 3,548,721 | 12/1970 | Eisenegger | 92/153 |
| 3,849,032 | 11/1974 | Mulvey et al. | 92/156 |
| 4,762,051 | 8/1988 | Besic et al. | 74/44 |

FOREIGN PATENT DOCUMENTS

| | | | |
|---|---|---|---|
| 0000611 | 2/1979 | European Pat. Off. | |
| 505268 | 7/1930 | Fed. Rep. of Germany | 184/18 |
| 533986 | 9/1931 | Fed. Rep. of Germany | 184/18 |
| 803599 | 2/1951 | Fed. Rep. of Germany | 184/6.8 |
| 1088182 | 9/1960 | Fed. Rep. of Germany | |
| 2311033 | 9/1974 | Fed. Rep. of Germany | 184/6.8 |
| 787130 | 6/1935 | France | 92/153 |
| 780052 | 7/1957 | United Kingdom | 92/155 |
| 2168125 | 6/1986 | United Kingdom | |

Primary Examiner—Robert E. Garrett
Assistant Examiner—Thomas Denion
Attorney, Agent, or Firm—Kenyon & Kenyon

[57] ABSTRACT

The cylinders of the compressor each have a guide piston connected with a work piston with each being reciprocally mounted within a guide cylinder and work cylinder. In addition, seals are provided between the guide piston and the guide cylinder within a half-portion of the guide piston proximate to the work piston while a scraper ring is provided in a second half-portion of the guide piston remote from the work piston in order to meter lubricant between the guide piston and guide cylinder. Excess lubricant which is splashed from the crank case into the guide cylinder is returned via the scraper ring to the crank case.

14 Claims, 1 Drawing Sheet

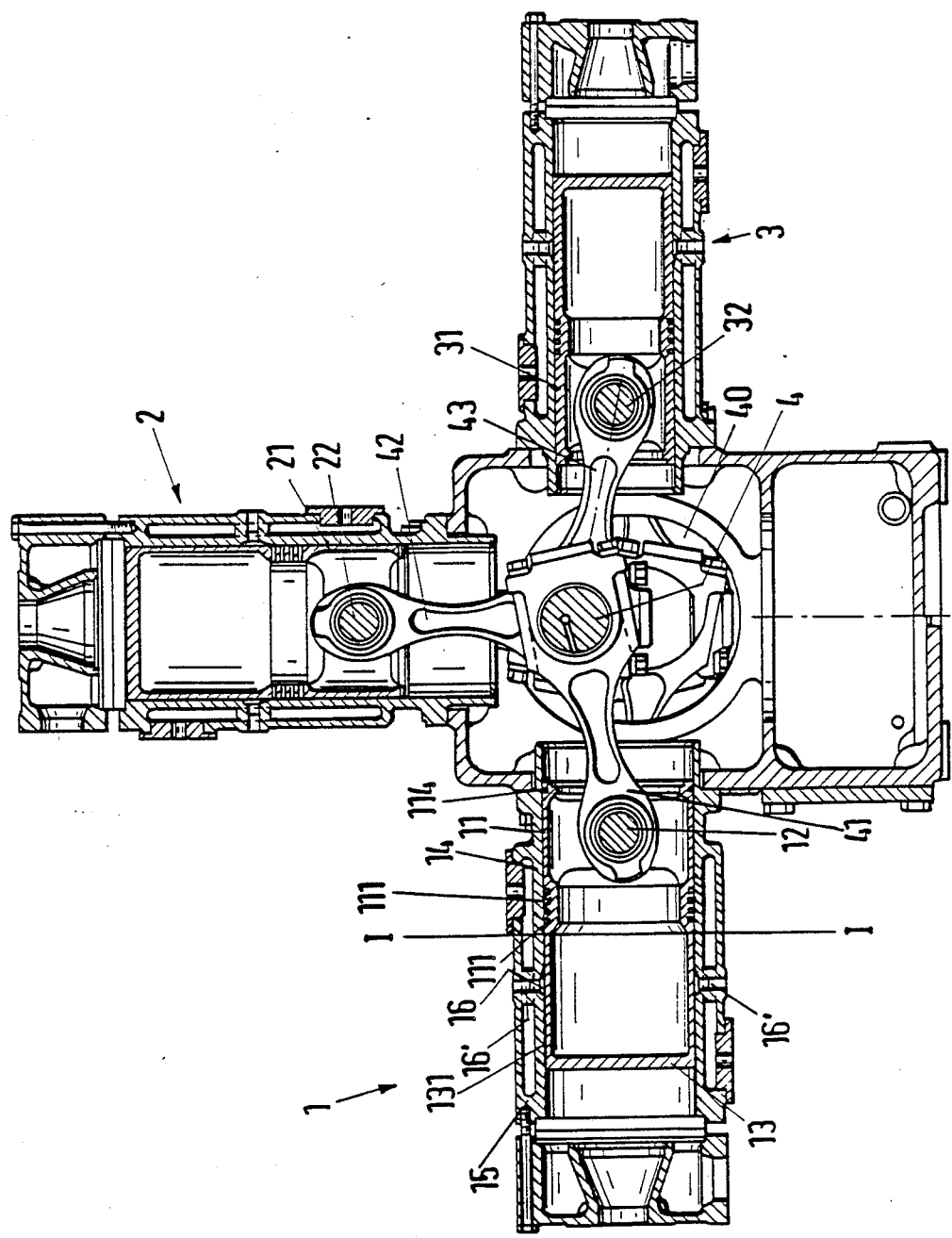

TRUNK PISTON COMPRESSOR

This invention relates to piston compressors. More particularly, this invention relates to a trunk piston compressor.

As is known, trunk piston compressors are usually constructed with one or more cylinders which can be driven from a common drive. In addition, each cylinder has been defined by a work cylinder in which a work piston, for example of the labyrinth seal kind, is reciprocally mounted in a work cylinder while a guide piston which is connected to the work piston is reciprocally mounted in a guide cylinder. Suitable sealing means are usually present between the guide piston and guide cylinder in an area proximate to the work piston.

In such compressors, the basic function of the guide piston which is guided in the guide cylinder is to provide compactness guiding of the work piston, that is, the piston compressing the work gas in the work cylinder. To this end, the work piston must be rigidly connected to the guide piston while the guide piston is driven, for example by way of a crank shaft and connecting rod to reciprocate within the guide cylinder. Generally, the guide cylinder and guide piston of known trunk piston compressors are splash lubricated from a crank case. However, other lubricant systems having lubricant passages or ways extending to the guide piston and/or guide cylinder are also known.

The function of the sealing elements on the guide piston and/or guide cylinder is to prevent lubricant from coming near the zone of the work piston and the work cylinder. This is necessary if the compressed work medium, such as a gas, is to be pure and free from lubricant as is required, for example in the food industry, pharmaceutical industry and respiratory air for humans.

One disadvantage of conventional trunk piston compressors is that the guide piston is lubricated with a copious lubricant flow or oil splash. Consequently, more lubricant than is necessary is usually present in the critical sealing zone of the guide piston. Further, in compressors of this kind, it has not always been possible to prevent the lubricant from reaching the work gas. Accordingly, expensive facilities for cleaning the work gas must be provided in order to remove the unwanted lubricant after compression.

Accordingly, it is an object of the invention to obviate, lubricant from passing into a compressed medium in a trunk piston compressor.

It is another object of the invention to avoid the need for expensive facilities for cleaning a compressed work gas of lubricant after compression in a compressor.

It is another object of the invention to produce a compressed medium which is free of lubricant.

Briefly, the invention provides a trunk piston compressor which is constructed with at least one work cylinder, a work piston reciprocally mounted in the work cylinder for compressing of a medium therein, a guide cylinder coaxially of the work cylinder and a guide piston reciprocally mounted in the guide cylinder and connected with the work piston. In addition, a sealing means is provided between the guide piston and the guide cylinder within a half-portion of the guide piston proximate to the work piston for blocking a flow of fluid thereby. A means for metering lubricant to the guide piston is also provided within a second half-portion of the guide piston remote from the work piston.

The means for metering or dispensing lubricant to the guide piston allows the quantity of lubricant for the guide piston to be limited to a satisfactory level. This, in turn, improves the seal tightness towards the work piston. Thus, even without special facilities for cleaning a compressed medium, the medium is adequately cleaned and free from lubricant.

Since ,the quantity of lubricant in the lubricant zone, that is, in the area between the guide piston and the guide cylinder, is metered, lubricant which creeps on the generated surface of the cylinder and/or piston towards the work piston and working medium, e.g. work gas, is greatly reduced or completely inhibited.

These and other objects and advantages of the invention will become more apparent from the following detailed description taken in conjunction with the drawing wherein:

The drawing illustrates a cross sectional view of a turn piston compression constructed in accordance with the invention.

As illustrated, the trunk piston compressor has two parallel connected cylinders 1, 2 which form the first stage of the compressor while a third cylinder 3 forms a second stage of the compressor. The three cylinders 1, 2, 3 are basically similar and, as in the case of reciprocating engines, it is conventional in the case of compressors to speak of "cylinders" in the sense of a complete compression unit comprising, for example, a work piston, a work cylinder, a guide piston and a guide cylinder.

In the illustrated embodiment, the second stage cylinder 3 has a work piston and guide piston as well as a work cylinder and guide cylinder which are of smaller cross section than the respective parts of the cylinders 1, 2.

A common crank drive 4 which is housed within a crank case 40 drives all three guide pistons 11, 21, 31 of the respective cylinders 1, 2, 3 and is connected thereto by way of a respective connecting rod 41, 42, 43 and a respective guide on pin bearing 12, 22, 32. Since the three cylinders 1, 2, 3 are substantially identical further description will be limited to the cylinder 1 shown to the left of the drawing.

As illustrated, the cylinder 1 includes the guide piston 11 which is reciprocally mounted in a guide cylinder 14 and connected to a work piston 13 for reciprocating the work piston 13. In this respect, the guide piston 11 and work piston 13 form a unitary one-piece member and are of the same outside diameter as one another. In addition, the work piston 13 is reciprocally mounted in a work cylinder 15 for compressing a medium such as a gas therein. The work cylinder 15 is, in turn, coaxial with the guide cylinder 11 and is formed in a unitary one-piece manner therewith.

A transition between the guide piston 11 and work piston 13 is illustrated near line I—I of the drawing. The transition between the guide cylinder 14 and the work cylinder 15 is near an annular groove 16 which functions as a leakage chamber between the cylinders 14, 15 connected to discharge passages or ways 16' for discharging leakage gas and/or leakage lubricant therefrom.

The work piston 13 is guided without contact in the work cylinder 15. The sealing of the work piston 13 and the work cylinder 15 is provided for by means of a labyrinth seal 131, for example, comprised of a screw thread-like structure on the generated surface of the work piston 13.

Sealing means in the form of four piston rings 111 are disposed between the guide piston 11 and the guide cylinder 14 within a half-portion of the guide piston 11 proximate to the work piston 13 for blocking a flow of fluid thereby. As indicated, the piston rings 111 are guided and retained in grooves in the generated surface of the guide piston 11.

The compressor is constructed to provide for a simple oil splash lubrication whereby oil is splashed from the crank case 40 into the guide cylinder 14, that is, unto the inside wall of the guide cylinder 14.

A means for metering lubricant to the guide piston 11 is also provided within a second half-portion of the guide piston 11 remote from the work piston 13. As illustrated, the means for metering is in the form of a scraper ring 114 which is received in an annular groove in a remote end of the guide piston 11 from the work piston 13. This scraper ring 114 is so constructed that of the more than adequate supply of lubricant oil splashed onto the inside wall of the guide cylinder 14, some of the lubricant oil returns directly to the crank case 40 during the return movement of the guide piston 11 towards the crank case 40 and only the quantity of lubricating oil needed for lubrication is left behind in the gap between the guide piston 11 and the guide cylinder 14.

Of note, a number of identical or different dispensing or metering rings may be used instead of a single such ring.

As illustrated, the guide cylinder 14 and work cylinder 15 and, in practice, the guide piston 11 and work piston 13 have the same diameter. This construction makes for compactness. However, the compressor may also be constructed with the diameters of the respective cylinders 14, 15 and pistons 11, 13 not being equal.

Instead of using an oil splash lubrication, the lubricant can be supplied and/or removed by way of passages or ways in the generated surface of the guide piston and/or guide cylinder.

The work piston and guide piston need not be of unitary construction but may be formed of separate components which are separately rigidly interconnected together.

While the illustrated embodiment shows a two-stage compressor, the lubricant metering means may also be used in single-cylinder compressors and in compressors having more than two stages and more than three cylinders.

The invention thus provides a sealing and metering arrangement within a compressor cylinder to obviate leakage of lubricant into a compressed medium such as a gas.

Thus, the invention also obviates the need for expensive facilities for cleaning the compressed gas in order to remove any unwanted lubricant after compression.

What is claimed is:

1. A trunk piston compressor comprising
   at least one work cylinder;
   a work piston reciprocally mounted without contact in said work cylinder for compressing of a medium therein;
   a guide cylinder coaxial of said work cylinder;
   a guide piston reciprocally mounted in said guide cylinder and connected with said work piston;
   sealing means between said guide piston and said guide cylinder within a half-portion of said guide piston proximate to said work piston for blocking a flow of fluid thereby;
   means for metering lubricant to said guide piston, said metering means being within second half-portion of said guide piston remote from said work piston; and
   a leakage chamber between said cylinders for discharging leakage lubricant therefrom.

2. A compressor as set forth in claim 1 wherein said means for metering includes a scraper ring received in an annular groove of said guide piston.

3. A compressor as set forth in claim 1 wherein said means for metering includes a scraper ring received in an annular groove of said guide cylinder.

4. A compressor as set forth in claim 1 which further comprises at least one passage in one of said guide piston and said guide cylinder near said metering means for delivering lubricant between said guide piston and said guide cylinder.

5. A compressor as set forth in claim 4 which further comprises least one passage in said guide piston near said metering means for removing surplus lubricant into the interior of said guide piston.

6. A compressor as set forth in claim 4 which further comprises at least one passage in said guide cylinder near said metering means and for removing surplus lubricant to the exterior of said guide cylinder.

7. A compressor as set forth in claim 1 wherein said guide piston and said work piston are of unitary one-piece construction.

8. A compressor as set forth in claim 1 wherein said guide piston and said work piston are of different outside diameters from each other.

9. A compressor as set forth in claim 1 wherein said means for metering is made of metal.

10. A compressor as set forth in claim 1 wherein said means for metering is made of a material selected from the group of plastics and ceramics.

11. In combination
    a work cylinder for receiving a medium to be compressed;
    a work piston reciprocally mounted without contact in said work cylinder for compressing the medium therein;
    a guide cylinder;
    a guide piston reciprocally mounted in said guide cylinder and connected to said work piston for reciprocating said work piston;
    sealing means between said guide piston and said guide cylinder within a half-portion of said guide piston proximate to said work piston for blocking a flow of fluid thereby;
    means for metering lubricant to said guide piston, said metering means being within a second half-portion of said guide piston remote from said work piston; and
    a leakage chamber between said work cylinder and said guide cylinder for discharging leakage medium and leakage lubricant therefrom.

12. The combination as set forth in claim 11 wherein said sealing means is disposed adjacent said work piston.

13. The combination as set forth in claim 12 wherein said metering means includes at least one scraper ring received in an annular groove in a remote end of said guide piston from said work piston.

14. The combination as set forth in claim 11 which further comprises a drive for driving said guide piston and a crank case for receiving lubricant for splashing into said guide cylinder.

* * * * *

UNITED STATES PATENT AND TRADEMARK OFFICE
CERTIFICATE OF CORRECTION

PATENT NO. : 4,920,862

DATED : May 1, 1990

INVENTOR(S) : EDUARD MULLER

It is certified that error appears in the above—identified patent and that said Letters Patent is hereby corrected as shown below:

```
Column 2, line 40 "guide on" should be -gudgeon-
Column 4, line 24 "means and for" should be -means for-
```

Signed and Sealed this

Twenty-second Day of October, 1991

Attest:

HARRY F. MANBECK, JR.

*Attesting Officer*  *Commissioner of Patents and Trademarks*